United States Patent [19]
Barnes

[11] Patent Number: 5,128,949
[45] Date of Patent: Jul. 7, 1992

[54] METHOD AND CIRCUIT FOR CONTROLLING THE EVOLUTION TIME INTERVAL OF A LASER OUTPUT PULSE

[75] Inventor: Norman P. Barnes, Tabb, Va.

[73] Assignee: The United States of America as represented by the Administrator of the National Aeronautics and Space Administration, Washington, D.C.

[21] Appl. No.: 359,460

[22] Filed: May 31, 1989

[51] Int. Cl.$^5$ .............................................. H01S 3/10
[52] U.S. Cl. .................................... 372/25; 372/30
[58] Field of Search ...................................... 372/25, 30

[56] References Cited

PUBLICATIONS

Koechner, Solid State Laser Engineering, pp. 426-431, Jan. 1976.
Optics Communications, vol. 65, No. 4, (Feb. 1988), pp. 283-286.
IEEE Journal of Quantum Electronics, vol. QE-17, No. 9 (Sep. 1981), pp. 1656.

*Primary Examiner*—William L. Sikes
*Assistant Examiner*—Robert E. Wise
*Attorney, Agent, or Firm*—Harold W. Adams; George F. Helfrich

[57] ABSTRACT

The invention, a method and circuit for controlling the evolution time interval of a laser output pulse, comprises means for pumping a laser medium 13 in a resonator 10 that includes a Q-switch 22 and polarizer 26 that act in combination to control the loss in the resonator 10. A photodiode 11 senses the resulting fluorescence 12 which is applied to a two level Q-switch driver 27 the output of which selectively adjusts the level of loss in the Q-switch 22 and polarizer 26 from high to intermediate to substantially zero loss states to control the evolution time interval of the resulting laser output pulse.

13 Claims, 2 Drawing Sheets

METHOD AND CIRCUIT FOR CONTROLLING THE EVOLUTION TIME INTERVAL OF A LASER OUTPUT PULSE

ORIGIN OF THE INVENTION

The invention described herein was made by an employee of the U.S. Government and may be manufactured and used by or for the Government for governmental purposes without the payment of any royalties thereon or therefor.

CROSS-REFERENCE TO RELATED APPLICATIONS

This application is related to copending application Ser. No. 359,459 filed May 31, 1989, entitled "Method and Circuit for Shaping Laser Pulses" now U.S. Pat. No. 4,959,838.

BACKGROUND OF THE INVENTION

1. Field of the Invention

The invention is a method of and circuit for controlling the evolution time interval of a laser output pulse and more particularly to such a method and circuit for producing narrow spectral bandwidths for use in making precise spectral measurements.

2. Description of the Prior Art

A recurring problem confronting lasers used for precise spectral measurements is the need for a narrow linewidth laser. A known approach to this problem is the use of a self-injection locking lasers in which a laser is operated in a high loss condition during the initial portion of the pulse evolution time interval. By operating in a high loss condition, the resulting laser output pulse will have made many round trips through a laser resonator. On each round trip, line narrowing elements operate on the radiation in the laser pulse to successively narrow its spectral linewidth. Thus, by increasing the loss, and thus the number of round trips, the linewidth of the laser becomes narrower.

Once a small laser pulse has evolved in a high loss resonator, the loss is switched in a single step or level action to a low loss state. In the low loss state, the majority of the energy is extracted in an efficient manner while retaining the narrow spectral linewidth of the initial pulse. Typically, a Q-switch, either an electro-optic or an acoustic-optic model, is used to effect switching to a low loss condition.

While this method of single level switching is operable, the time at which the laser is switched directly from a high loss condition to a low loss condition is a critical limitation. If the single level of switching occurs too early, insufficient round trips will have been completed leaving a wider than desired linewidth. Thus the output pulse evolution time interval is too short.

In the known method, this effect is counteracted through the use of an optical sensor to detect the level of the output laser radiation from an output element such as an output mirror. When the output laser radiation builds to a sufficient level, such an optical sensor detects this level and switches the laser to a low loss condition in a single level switching action. Although this is an improvement, it does not directly regulate the number of round trips required to achieve the desired spectral linewidth.

Thus, if the pumping level is too high, a laser output pulse will evolve in the resonator quickly, thus counteracting the effect of the line narrowing elements. If the pumping level is too low, the laser may never come to threshold and lasing preventing altogether. In addition, this method introduces an indeterminacy or jitter into the time at which the laser output pulse occurs.

As the output pulse evolution time interval depends on the level of the pump, the time at which the pulse occurs may be set by the pumping level rather than an external clock. While external clocks are known to be highly accurate, the level of pumping is usually not accurately known or controllable. Thus, though any resulting jitter may not be much, probably on the order of a microsecond or so, it may cause problems if precise ranging is to be performed.

OBJECT AND SUMMARY OF THE INVENTION

An object of the invention is to provide a method and circuit for controlling the evolution time interval of a laser output pulse and more particularly to such a method and circuit for regulating the spectral bandwidth of laser pulses used for making spectral measurement.

In accordance with the invention, the level of a pump is sensed and the loss level is regulated in the laser. By regulating the loss level in relation to the pump, the pulse evolution time interval may be regulated more accurately. This is achieved by making the pulse evolution time interval, and thus the number of round trips, independent of the level of the pump at least through first order. Thus improving the performance of the laser while allowing the time of switching to be set by an external clock rather than by the level of the pump.

The method and circuit in accordance with this invention in general includes means for achieving the controlled, two level switching of a Q-switch to provide a narrow line width laser pulse without a severe loss in efficiency. Means are provided for varying the switching voltage of the two level Q-switching system to allow for varying levels of gain in an active laser or medium in a laser resonator. Timing means permit varying the timing of the two level Q-switching action to achieve the best performance based on both the resulting spectral line width and laser output energy.

BRIEF DESCRIPTION OF THE DRAWINGS

The above and numerous other objects and advantages of the invention will become apparent from the following Detailed Description when read in view of the appended drawings wherein.

BRIEF DESCRIPTION OF THE PREFERRED EMBODIMENT

In many laser resonator systems which may include self-injection locking lasers, spectral line width is determined by the physical characteristics of the laser medium. In such arrangements, a conventional Q-switch in combination with a polarizer is either in a high loss or a low loss state determined by the voltage applied to the Q-switch. In the high loss state, laser oscillation or laser action is prevented by the high loss associated with the Q-switch and polarizer. When the Q-switch is switched in a single switching action or level directly to the low loss state, a laser pulse evolves. The ensuing pulse evolution time interval is determined by the gain of the active laser medium and the loss in the laser system.

While the laser pulse is evolving, the spectral line width is determined by the number of passes which the nascent laser pulse makes through line narrowing elements in the system. As the number of passes increases, the spectral line width of the laser becomes successively narrower. Thus the spectral line width is determined by both the level of gain and the loss of the laser. While spectral line width may be controlled by keeping the losses low enough to be overcome by the gain but high enough to ensure a large number of passes through the line narrowing elements, this leads to inefficient laser action as most of the laser energy is dissipated in the losses.

Figure 1:
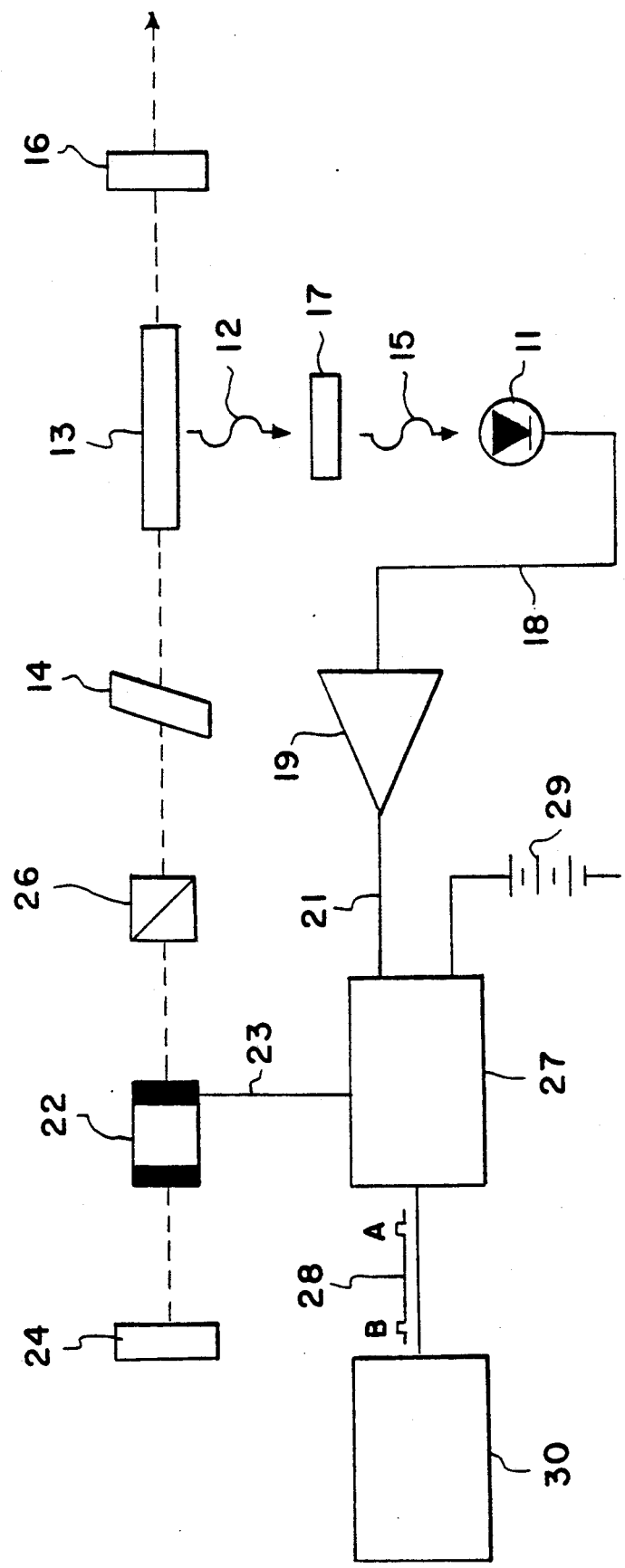
FIG. 1 is an electrical schematic of a preferred embodiment of the invention including electro-optical means for sensing the pumping level of a laser device and a two level driver for a Q-switch.

Referring to the drawings, FIG. 1 illustrates a preferred embodiment of the invention for controlling the output pulse evolution time interval of a laser pulse to provide a desired narrow spectral line width laser pulse without the inefficiency associated with prior art devices as generally described above. As shown, a laser resonator 10 generally includes an optical detector 11, such as a photodiode, that is exposed to fluorescence 12 emitted by a laser medium 13 mounted in an optical radiation path between a conventional line narrowing element 14 and output mirror 16.

As is known fluorescence 12 from the laser medium 13 is directly proportional to the photon population of the upper laser level and, thus the effective pumping level. A spectral filter 17 may be used in front of the optical detector 11 to reject the unwanted background radiation. Output 18 from the optical detector 11 is then amplified by an amplifier 19. Typically an amplifier with a large voltage gain to provide a first output control signal 21 that determines the loss level by applying the proper voltage V to the Q-switch 22.

For a loss element such as electro-optic Q-switch 22, in an optical path between a total mirror 24 and polarizer 26, the first control signal or voltage pulse 21 can be applied directly on Line 23 to the Q-switch through a Q-switch driver 27 in response to a pulsed trigger input pulse 28A from a suitable pulse generator 30 and a selectively variable high voltage input 29.

As the level of the combined losses of electro-optic Q-switch 22 and polarizer is related to the applied voltage 21, 29 or V, the applied voltage 21, 29 or V may be used to regulate the loss directly. To increase the accuracy of the device, the voltage tripper pulse 28A is applied to the Q-switch driver 27 in addition to the DC voltage 29. After a determined time interval, trailing pulse 28B from pulse generator 30 activates the two level Q-switch driver 27 to remove the intermediate first control voltage 21 and apply a voltage V to Q-switch 22 sufficient to sustain laser action in the laser resonator. Thus, with this arrangement, the loss can be approximately by a linear, rather than a direct, single action or level switching action. If closer loss regulation is required, a nonlinear amplifier 19 may be used.

In addition, to achieving this laser action with a unique two level switching of Q-switch 22, the invention provides for automatic compensation for varying levels of gain in the laser system. When triggered by the first pulse 28A from pulse generator 30, the Q-switch and polarizer combination changes from a high loss situation to an intermediate loss situation. In this configuration, the round trip gain is relatively low. That is, the gain employed by the nascent laser pulse in the active laser 13 medium is offset to a large degree by the losses produced by the Q-switch 22. In this situation, many round trips are required for the laser to evolve. As such, the spectral line width is narrow.

However, before significant energy extraction occurs, the second pulse 28B is received from pulse generator 30. The second pulse 28B causes the Q-switch driver 27 to apply voltage V to switch the Q-switch 22 and polarizer to the low loss state. In this situation, the energy can be extracted without the additional loss associated with the intermediate level of the Q-switch. Thus, the energy can be extracted from the laser in a more efficient manner.

To ensure both narrow line and efficient operation of the laser, the timing of the two pulses 28A and 28B which activate the Q-switch driver 27 is critical. If the gain is too high, the laser pulse will evolve before the Q-switch 22 is activated the second time and the laser will operate inefficiently. By adjusting the losses in accordance with the gain as achieved by this invention the evolution time interval of the output pulse remains approximately constant which promotes optimum performance.

Thus, automatic compensation for the varying levels of gain is provided illustrated in FIG. 1. As pumping of the active laser medium increases, the fluorescence 12 increases proportionally. Increases in the fluorescence 12 are detected by the photodiode 11. The spectral bandpass filter 17 helps assure that the detector 11 sees only light in the spectral region of the fluorescence 12. With an increase in the gain, an increase in the voltage 21 applied to the Q-switch 22 is achieved by amplifying the output of the photodiode 11 and applying it to the Q-switch 22 through the Q-switch driver 27. Thus, the intermediate loss level is controlled by a combination of the high voltage 29 and the fluorescence level 12. By varying the loss produced by the Q-switch 22 in proportion to the gain, the same net gain can be achieved. By maintaining constant net gain, the pulse evolution time interval of the output pulse is controlled. Thus the number of round trips and the spectral line width remain the same even if the gain in the active medium changes.

Figure 2:
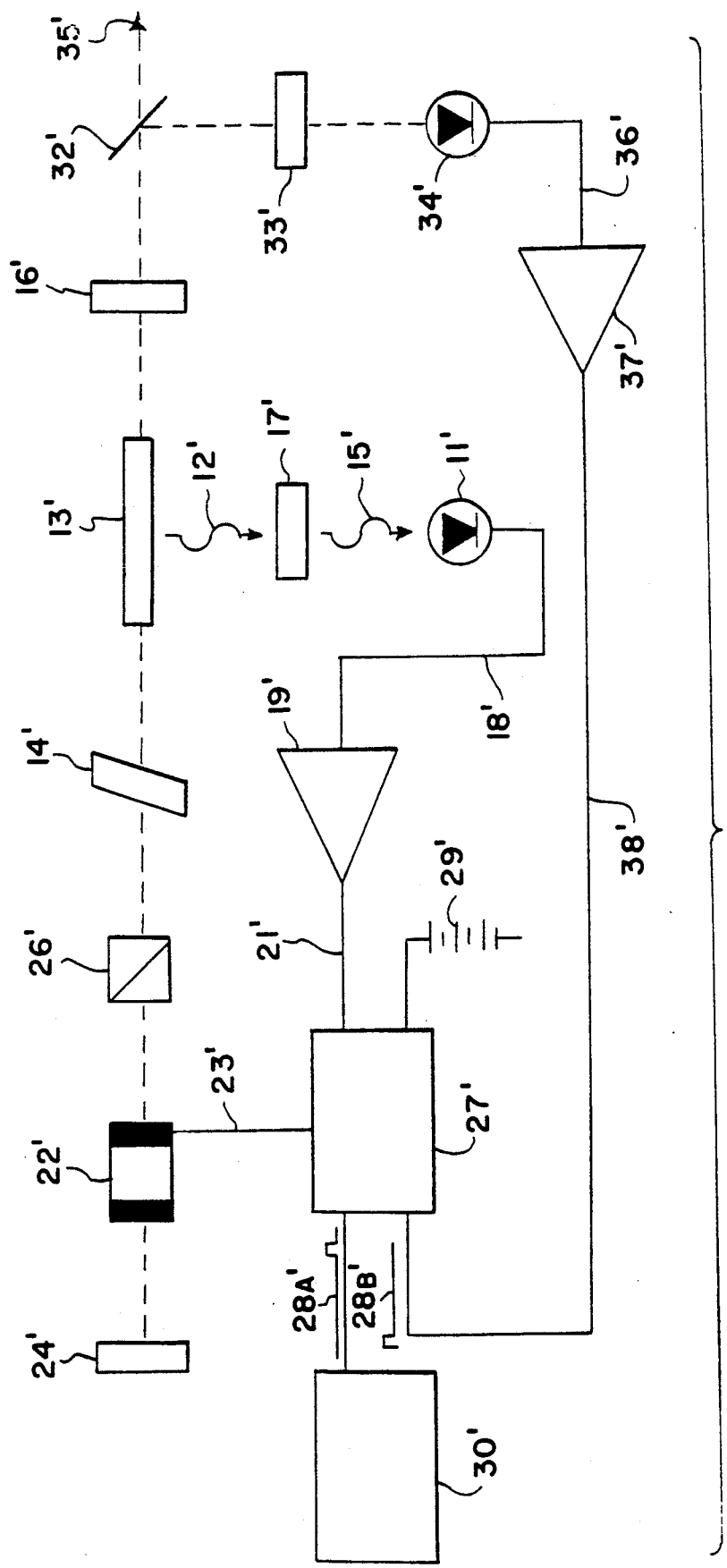
FIG. 2 is an electrical schematic of an alternative embodiment of the invention illustrated in FIG. 1 including means for sensing and using a laser output to control the switching action of the two level driver for the Q-switch.

An alternative method and circuit for varying the timing of the application of the second level switching voltage 21' of the Q-switch in accordance with the invention is shown in FIG. 2. In this configuration, only one trigger pulse 28A' from an external pulse generator 30' is required. Switching from the high loss level (voltage 29') to the intermediate loss level (voltage 21') occurs upon receipt of this trigger pulse 28A'. As the laser output pulse evolves a small fraction of the laser output pulse 35' is reflected by mirror 32' through filter 33' and detected by a second photodiode 34'. The output of photodiode 34' is amplified by amplifier 37' to provide a second control signal 38' which actuates Q-switch driver 27'60 upon reaching a pulse of determined value.

When a small but significant amount of energy is available, it is detected by the second photodiode 34' the resulting second control signal 38' causes the Q-switch driver 27' to switch to the second voltage V or low loss level of Q-switch 22. Thus, the majority of the laser output pulse energy can be extracted under the low loss condition.

In this alternative embodiment, the exact time at which the Q-switch 22' changes from the intermediate loss situation determined by voltage 21' to the low loss situation as determined by voltage V is controlled. This action is dependent upon the output of photodiode 34' and is determined by the spectral linewidth of the output pulse which is a function of the number of round trips within the laser resonator and thus the pulse evolution time interval. Thus, the timing between the two control signals is controlled automatically once started. With this automatic control, the maximum laser output energy with the minimum spectral line width can be achieved.

While a preferred and alternative embodiments have been described in detail, numerous changes and modifications may be made without departing from the invention which is to be limited only by the appended claims.

What is claimed is:

1. A method of controlling the evolution time interval of a laser output pulse formed in and discharged from a laser resonator including a laser medium, and loss elements comprising a Q-switch and polarizer, the steps comprising:
   pumping said laser medium to a state of fluorescence;
   sensing and converting the level of said florescence into a first control signal;
   adjusting the combined loss level of said Q-switch and polarizer over a determined time interval in response to said first control signal to control the evolution time of said laser output pulse from said laser resonator in said Q-switch and polarizer.

2. The method of claim 1 including the step of converting the sensed level of fluorescence into a nonlinear control signal.

3. The method of claim 1 including the step of converting the sensed level of fluorescence into a linear control signal.

4. The method of claim 1 wherein the combined loss level of said Q-switch and polarizer is varied from a high state to an intermediate state in response to said first control signal during said determined time interval.

5. The method of claim 4 wherein the combined level of loss of said Q-switch and polarizer are switched from said intermediate level to a low level at the end of said determined time interval.

6. The method of claim 1 including the step of sensing and converting the level of said laser output pulse as it evolves in said laser resonator into a second control signal; and
   adjusting the combined loss level of said Q-switch and polarizer in response to said first control signal until said second control signal reaches a determined value.

7. The method of claim 1 wherein said laser resonator includes spectral linewidth narrowing means for successively narrowing the linewidth of said resulting laser output pulse during said evolution time interval.

8. In a circuit for controlling the evolution time interval of a laser output pulse from a laser resonator including a laser medium and a control signal responsive Q-switch and polarizer acting in combination to establish high, intermediate, and low loss levels in said laser resonator in response to determined, control signals of high, intermediate and low values corresponding to said high, intermediate and low loss levels upon the pumping of said laser medium, the improvement comprising:
   means for sensing and providing a first control signal representative of the level of pumping of said laser medium; and
   Q-switch driver means responsive to said first control signal for selectively applying said high, intermediate, and low values of said control signals to operate said Q-switch during a determined time interval that corresponds to said evolution time interval.

9. The invention as defined in claim 8 wherein said laser resonator includes spectral linewidth narrowing means for successively narrowing the linewidth of said resulting laser output pulse during said evolution time interval.

10. The invention as defined in claim 8 wherein said control signals are voltage and said high and low voltage values are fixed and said intermediate voltage varies in value therebetween during said evolution time interval.

11. The invention as defined in claim 10 including means for sensing and converting a level of fluorescence from said laser medium during the pumping thereof into a first control signal corresponding to said intermediate voltage.

12. The invention as defined in claim 10 including means for sensing and converting the level of said laser output pulse into a second control pulse corresponding to said low voltage and for activating said Q-switch driver to operate said Q-switch to said low loss level when said second control voltage equals a determined value thereby automatically controlling the evolution time interval of said laser output pulse.

13. The invention as defined in claim 8 including timing pulse generator means for determining said evolution time interval.

* * * * *